(No Model.)
J. T. MAYHEW.
FENCE.
No. 406,925. Patented July 16, 1889.
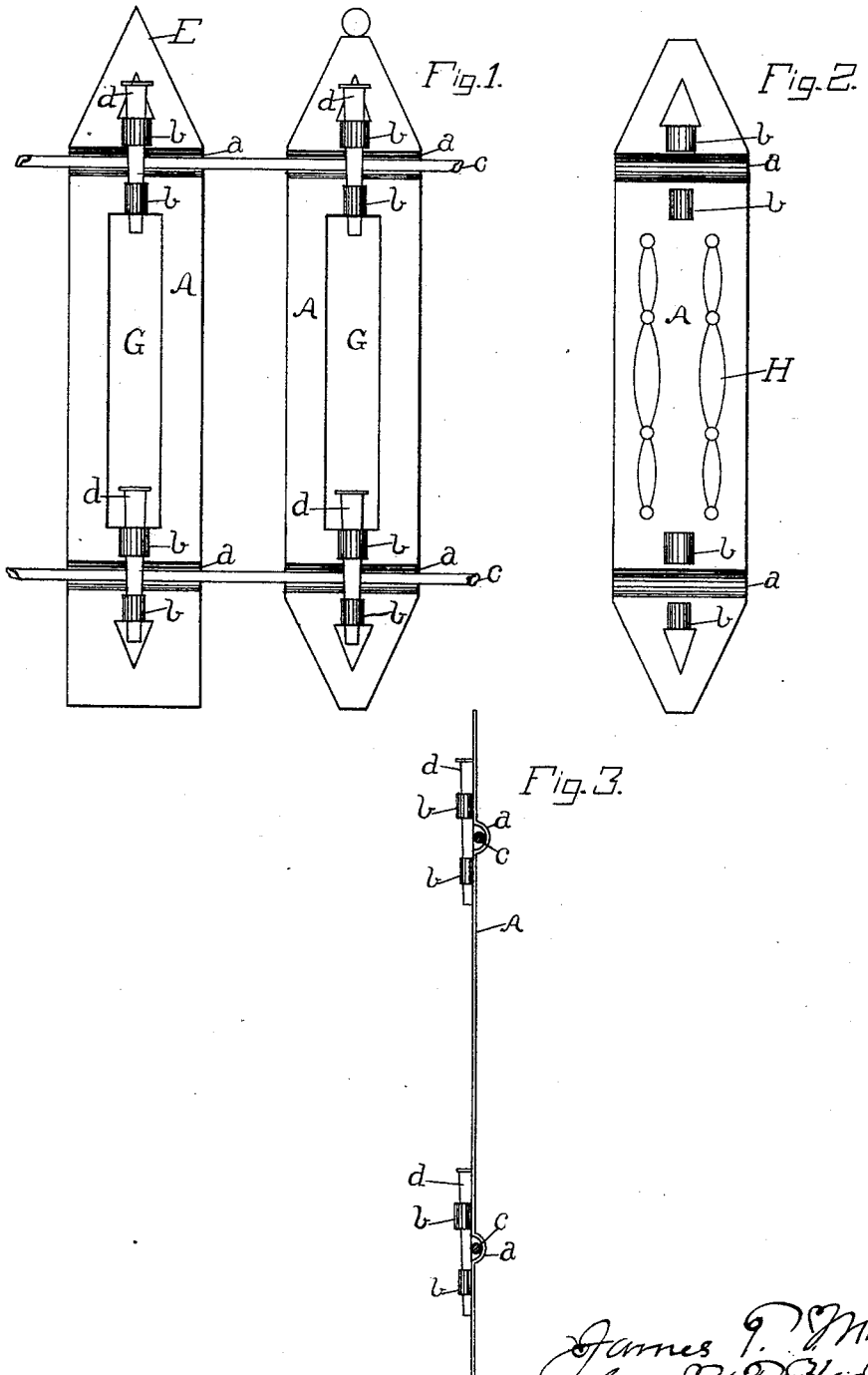
Witnesses
M. C. Galer.
James R. Finlayson
James T. Mayhew
by H. T. Hazard, his
Inventor

UNITED STATES PATENT OFFICE.

JAMES T. MAYHEW, OF VISTA, CALIFORNIA.

FENCE.

SPECIFICATION forming part of Letters Patent No. 406,925, dated July 16, 1889.

Application filed March 21, 1889. Serial No. 304,222. (No model.)

*To all whom it may concern:*

Be it known that I, JAMES T. MAYHEW, a citizen of the United States, residing at Vista, in the county of San Diego and State of California, have invented a new and useful Improvement in Removable Adjustable Fences, of which the following is a full, clear, and exact description, reference being had to the accompanying drawings, forming part of this specification.

Figure 1 represents a detached portion of my improved fence in elevation. Fig. 2 represents one of the palings or pickets detached. Fig. 3 represents an edge view of one of the palings, and exhibits the projections caused by pressing grooves in them to receive keys to hold them in place and to receive wires attached to fence-posts to which the palings are secured.

The object of my invention is to furnish a cheap, durable, and ornamental fence, preferably formed of sheet-iron palings and wire stringers, the palings being removable and laterally adjustable to make an inclosure inaccessible to small animals, and which may be rapidly formed of sheet-iron by the use of dies.

My fence palings or pickets A may be of sheet-iron cut out and stamped by dies formed for the purpose, by the use of which the grooves $a$ $a$ for the stringer-wires $c$ $c$, which will be attached to fence-posts at a proper distance apart, will be formed on one side of the pales and the short grooves $b$, for the keys $d$ to enter to hold the palings to the stringer-wires, will be formed on the opposite side. The keys, being of wedge form, will serve to secure the palings A firmly to the wires $c$; but they may be loosened for adjustment (by partially withdrawing the keys) from or toward each other, whereby the fence can be made suitable to protect against fowls or rabbits or other animals, as may be desired.

To form an inclosure for fowls, the apex of the palings or pickets may be pyramidal, as shown at E, Fig. 1; and it is evident that instead of the open panels shown at G, Fig. 1, ornamental openings, similar to those represented at H, Fig. 2, may be formed in the body of the panel by the dies used to cut them out of the sheet metal, and by these means of forming and cutting the panels they may be produced very rapidly and cheaply and of any determined ornamental shape or design.

Besides the advantage and convenience of the capability of adjustment of the palings toward or from each other, as occasion may require, it is apparent that they may be quickly removed from the stringer-wires $c$ by withdrawing the keys and be compactly transported to form inclosures at any locality and for any purpose necessary, as above mentioned.

Having described my improvement in removable adjustable fences, I here state that I am aware that pickets for fences have been cast with transverse grooves in them to receive a stringer or longitudinal support; also, that barbs have been secured to wires for fencing by open slots and keys. I do not claim either of these means of attaching metal pales or pickets to supporting wires or stringers; but What I do claim, and desire to secure by Letters Patent, is—

The open-panel pickets A, formed by dies of sheet metal, with transverse grooves $a$ upon one side and longitudinal adjoining grooves or loops $b$ on the opposite side, in combination with stringers $c$ and keys $d$, constituting a removable adjustable fence, as described.

JAMES T. MAYHEW.

Witnesses:
H. P. K. PECK,
JAMES R. FINLAYSON.